United States Patent [19]
Gilman, Jr. et al.

[11] Patent Number: 5,913,014
[45] Date of Patent: Jun. 15, 1999

[54] TRANSFORMS FOR DIGITAL IMAGES

[75] Inventors: Paul B. Gilman, Jr., Penfield;
Elizabeth McInerney, Rochester;
Richard M. Vogel, Pittsford, all of N.Y.

[73] Assignee: Eastman Kodak Company, Rochester, N.Y.

[21] Appl. No.: 08/897,868

[22] Filed: Jul. 21, 1997

[51] Int. Cl.$^6$ .............................. H04N 1/407; H04N 1/60
[52] U.S. Cl. ......................... 395/109; 345/153; 345/150;
358/504; 358/518; 358/519; 358/521; 358/406;
358/455
[58] Field of Search ............................ 395/109; 345/150,
345/153; 358/518, 519, 521, 504, 455, 406

[56] References Cited

U.S. PATENT DOCUMENTS

| | | |
|---|---|---|
| 4,792,518 | 12/1988 | Kuwashima et al. . |
| 5,300,381 | 4/1994 | Buhr et al. . |
| 5,309,257 | 5/1994 | Bonino et al. ............................ 358/504 |
| 5,313,310 | 5/1994 | Numakura et al. ...................... 358/455 |
| 5,528,339 | 6/1996 | Buhr et al. . |

OTHER PUBLICATIONS

"The Tone Reproduction of Colour Photographic Materials," R.W.G. Hunt, I.T. Pitt, and P.C. Ward, J. Photog. Sci., 17:198(1969).

*Primary Examiner*—Scott Rogers
*Attorney, Agent, or Firm*—Raymond L. Owens

[57] ABSTRACT

A method for constructing a transform for a predetermined display or printer, such printer being adapted to form a black and white or color print, on a particular medium, the input to the transform being a digital image file produced by a particular image capture device including providing an input characteristic curve which is a function of the output color code values from the image capture device and relative log exposure of the scene; providing an aim curve which is a function of the visual density of the display or colored print and the image capture relative log exposure wherein the mid region of the aim curve has a range of contrasts between 1.00 and 1.30 to a relative log exposure of 0.6 above scene white and a mid-scale contrast of between 1.0 and 1.7 at a relative log exposure of 1.45 above scene white and the shoulder of the curve ends at the maximum density Dmax) of the particular medium and the toe of the curve ends substantially at the minimum density (Dmin) of the particular display or medium; and providing an output characteristic curve which is a function of the input color code values to the predetermined display or printer and the visual density from a display or print on a particular medium. The method further includes using the aim curve, the input characteristic curve, and the output characteristic curve to produce the transform.

9 Claims, 7 Drawing Sheets

| | 255 | 250 | 240 | 230 | 220 | 210 |
|---|---|---|---|---|---|---|
| 200 | 190 | 180 | 170 | 160 | 150 | 140 |
| 130 | 120 | 110 | 100 | 90 | 80 | 70 |
| 60 | 50 | 40 | 30 | 20 | 10 | 0 |

TRANSFORMS FOR DIGITAL IMAGES

FIELD OF THE INVENTION

This invention relates to a method of constructing a transform for improving the display or making prints from digital images.

BACKGROUND OF THE INVENTION

It is important in producing displays or prints from digital images to fit the dynamic range of the originally captured scene to the dynamic range of the materials available for displaying or printing using the best possible transform. A limiting factor is the dynamic range of the materials available for displaying or printing. By selectively choosing the proper transform for displaying or printing, it is possible to display or print esthetically pleasing images on materials that have less dynamic range than the original scene.

As new materials such as thermal print media and receivers and ink jet technologies have become available for displaying or printing, they have introduced larger dynamic range than available with previous technologies. It is well known how to display or print digital images on these types of media. However, it is difficult to design different transforms that best take advantage of these new media. A key element in any new transform is to be able to utilize the full dynamic range of the media for displaying or printing the digital images.

There have been a number of techniques for improving the tone reproduction of digital images, see for example, U.S. Pat. No. 4,792,518 and U.S. Pat. No. 5,300,381. For a discussion of tone reproduction, see "The Tone Reproduction of Colour Photographic Materials," R. W. G. Hunt, I. T. Pitt, and P. C. Ward, J. Photog. Sci., 17:198 (1969).

As set forth in the above disclosures, a number of techniques are disclosed which require that the media be photographic media and the techniques for making the images are very complex. The publication by Hunt et al. describes the "ideal system" for printing photographic images to correct for camera flare, printer flare, and viewing flare but offers no practical way to implement this theoretical tone reproduction curve because of the lack of digital imaging tools and the limitations of the materials available in 1969.

U.S. Pat. No. 5,528,339 discloses techniques for improving the tone reproduction of digital images on other media such as thermal, ink jet and electrophotographic. However, the media available for the printing of the digital images far exceeds the dynamic range previously described by having lower minimum densities and considerably higher maximum densities. The same problems exist for soft copy outputs on screens.

SUMMARY OF THE INVENTION

It is an object of the present invention to facilitate the printing of digital images with improved tone reproduction and ensuring that such images provide esthetically pleasing results.

It is another object of the present invention to provide new techniques for improving the image quality of digital images on displays with a wider dynamic range than previously available.

These objects are achieved by a method for constructing a transform for a predetermined display or printer, such printer being adapted to form a black and white or color print, on a particular medium, the input to the transform being a digital image file produced by a particular image capture device, comprising the steps of:

a) providing an input characteristic curve which is a function of the output color code values from the image capture device and relative log exposure of the scene;

b) providing an aim curve which is a function of the visual density of the display or print and the image capture relative log exposure wherein the mid region of the aim curve has a mid-scale contrast of between 1.00 and 1.30 at a relative log exposure of 0.6 above scene white and a mid-scale contrast of between 1.0 and 1.7 at a relative log exposure of 1.45 above scene white and the shoulder of the curve ends at the maximum density Dmax) of the particular medium and the toe of the curve ends substantially at the minimum density (Dmin) of the particular display or medium;

c) providing an output characteristic curve which is a function of the input color code values to the predetermined display or printer and the visual density from a display or print on a particular medium; and d) using the aim curve, the input characteristic curve, and the output characteristic curve to produce the transform.

It is an advantage of the present invention to produce a transform which can be used either in soft displays for displaying images or for use in printing black and white or colored images. This technique can be readily implemented in a computing system. Such a computing system can include a microprocessor which can produce continuous tone prints which are esthetically pleasing.

In accordance with the present invention, the original scene image is not duplicated, but the tone reproduction of it's corresponding digital image is shaped so as to produce an esthetically pleasing display or print.

It is a feature of the present invention that it optimizes tone reproduction in the Dmin and Dmax regions of display or print material.

DETAILED DESCRIPTION OF THE INVENTION

Print media, such as thermal print and ink jet receivers, can produce images with a fairly wide dynamic range. The present invention makes it possible to produce a new transform which will produce tone reproduction curves that are capable of providing an even higher level of image quality than previously obtainable. As will be seen, it is very simple to implement these techniques to optimize tone reproduction curve adjustments.

Image capture devices, in accordance with the present invention, can include digital cameras and scanners. Images that are captured, for example, on other origination sources (photographic paper, slides and negatives) can be converted to digital images by scanners. Printers, in accordance with the present invention, can be silver halide printers, thermal printers, ink jet printers, electrophotographic printers, and the like.

The present invention is applicable for printers which produce colored prints on a particular medium. However, it is also applicable for displaying images on a display such as a cathode ray tube (CRT) monitor. Moreover, the present invention is also applicable for making black and white or colored prints.

Figure 1:
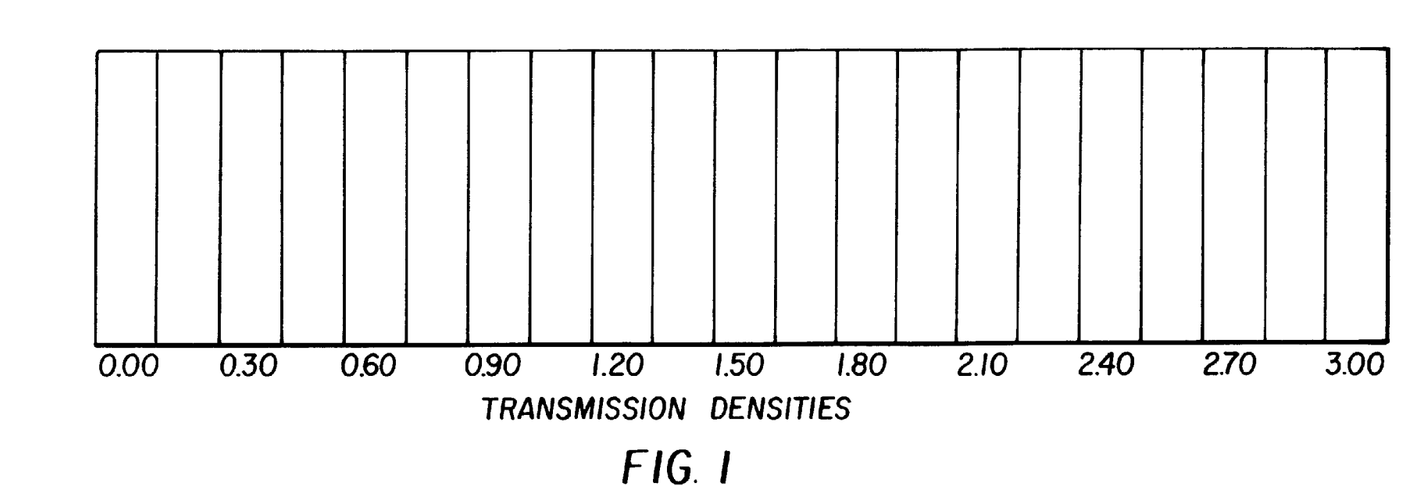
FIG. 1 is a test chart which is used in determining the input characteristic curve of an image capture device in accordance with the present invention.
Figure 2:
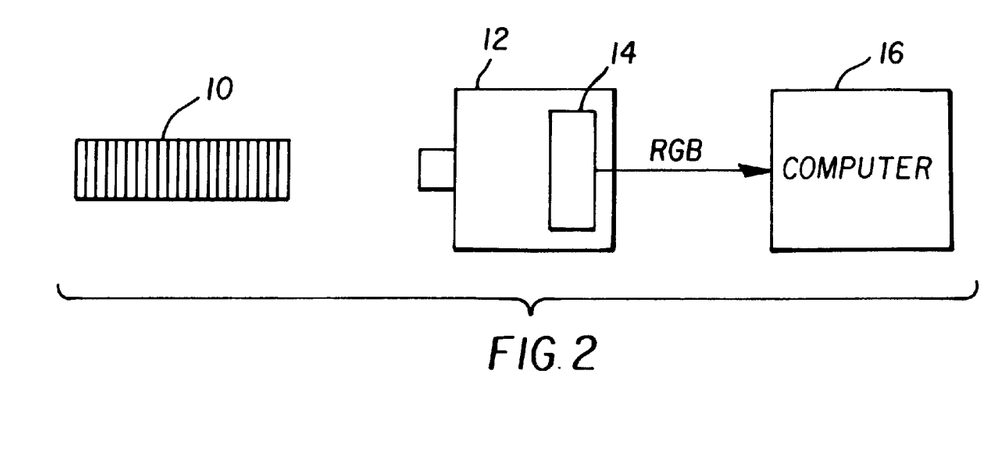
FIG. 2 is a block diagram of a test setup for determining the input characteristic curve of an image capture device in accordance with the present invention.
Figure 3:
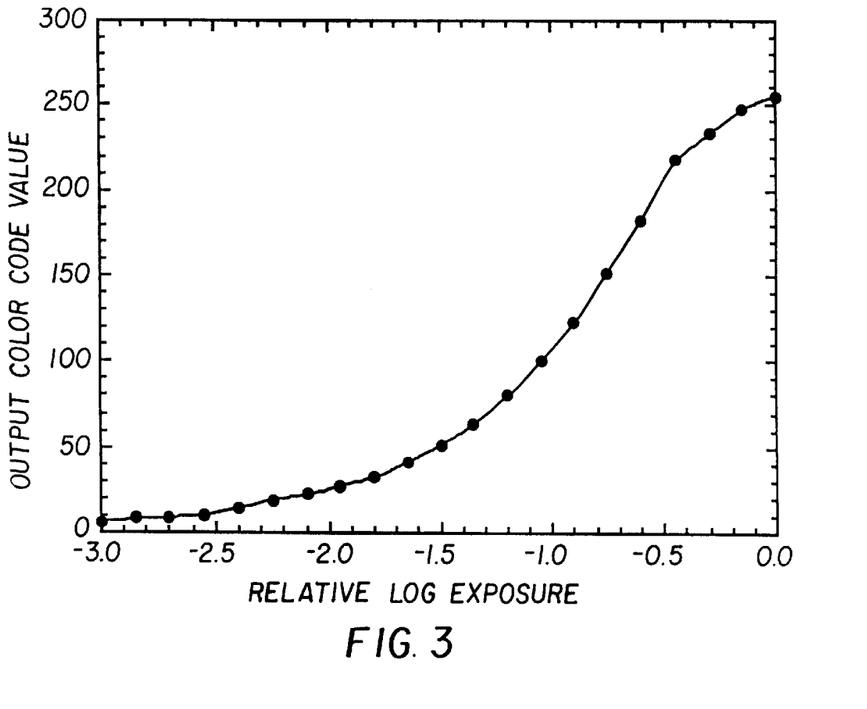
FIG. 3 is an example of an input characteristic curve for an image capture device in accordance with the present invention.

FIG. 1 is a diagram of a test chart which is suitable for determining the input characteristic curve of an image capture device using 21 neutral patches contained in the chart. In accordance with the present invention, an image of this chart 10 is captured by a digital image capture device 12, shown in FIG. 2, and stored in a memory 14. The image of the test chart is transferred from the memory 14 of the digital image capture device 12 into a digital computer 16 where the average output color code values of each neutral patch of the test chart are measured using an image handling program such as Adobe Photoshop. By way of example, Table 1 summarizes the output color code values obtained from a Kodak model NC-2000 digital camera for a typical 21-step test chart under nominal exposure conditions. Under nominal exposure conditions, the relative transmission densities of the test chart produce corresponding relative log exposure values for the scene as shown in the table. The average output color code values for each neutral patch of the test chart are plotted versus the corresponding relative log exposure values for each neutral patch to form the input characteristic curve for the capture device as shown in FIG. 3.

TABLE 1

Output code value vs. relative log exposure for Kodak NC-2000 camera.

| Transmission Density | Relative Log Exposure | Output Code Value |
|---|---|---|
| 0.00 | 0.00 | 255 |
| 0.15 | −0.15 | 248 |
| 0.30 | −0.30 | 233 |
| 0.45 | −0.45 | 218 |
| 0.60 | −0.60 | 182 |
| 0.75 | −0.75 | 152 |
| 0.90 | −0.90 | 123 |
| 1.0 | −1.0 | 100 |
| 1.30 | −1.30 | 80 |
| 1.35 | −1.35 | 64 |
| 1.50 | −1.50 | 51 |
| 1.65 | −1.65 | 41 |
| 1.80 | −1.80 | 32 |
| 1.95 | −1.95 | 27 |
| 2.10 | −2.10 | 22 |

TABLE 1-continued

Output code value vs. relative log exposure for Kodak NC-2000 camera.

| Transmission Density | Relative Log Exposure | Output Code Value |
|---|---|---|
| 2.25 | −2.25 | 19 |
| 2.40 | −2.40 | 14 |
| 2.55 | −2.55 | 10 |
| 2.70 | −2.70 | 9 |
| 2.85 | −2.85 | 8 |
| 3.00 | −3.00 | 6 |

Figure 4:
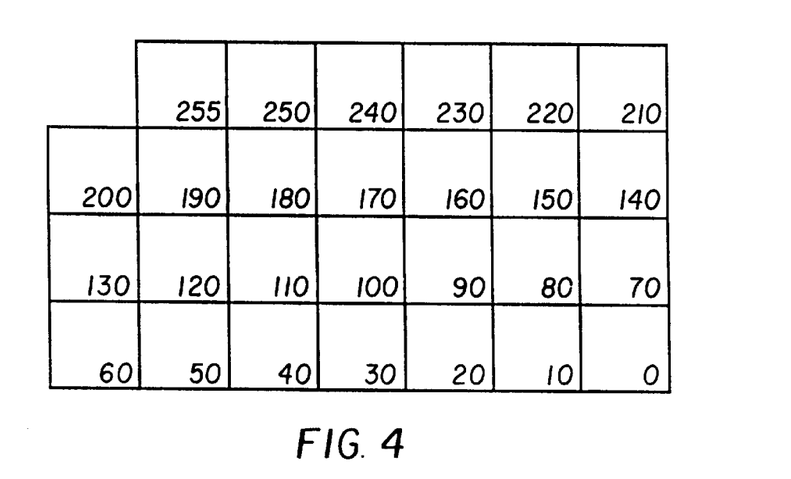
FIG. 4 is a test chart which can be used in determining the output characteristic curve of a predetermined printer/medium combination in accordance with the present invention.

FIG. 4 is a diagram of a test chart including a plurality of neutral patches having equal color code values. By way of example, the test chart shown in FIG. 4 indicates that each set of color code values is separated by an increment of 10 code values over the code value range 0 to 250. Other code value ranges and increments are possible.

Figure 5:
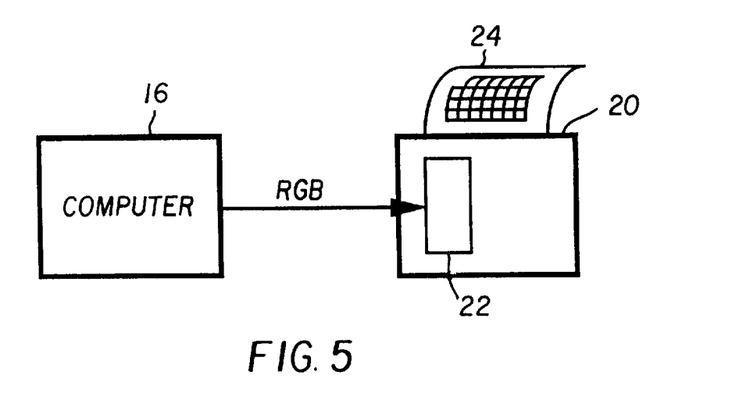
FIG. 5 is a block diagram of a test setup for determining the output characteristic curve of a printer/medium combination in accordance with the present invention.
Figure 6:
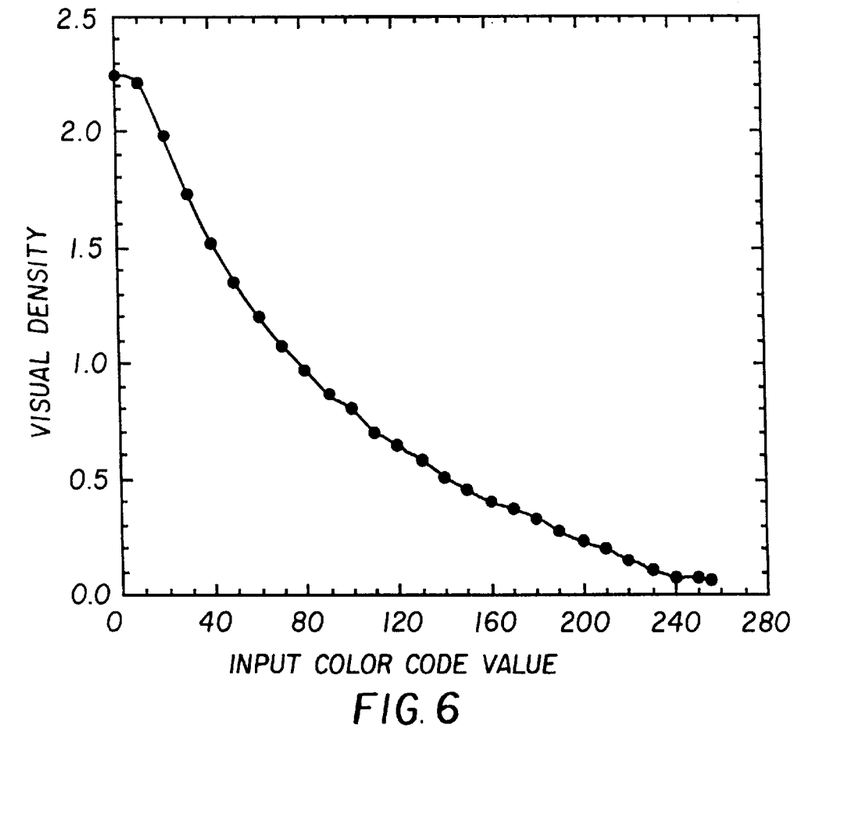
FIG. 6 is an example of an output characteristic curve for a printer/medium combination in accordance with the present invention.

As shown in FIG. 5, an image file of the printer characterization test chart is transferred from the digital computer 16 to an image memory 22 of an output printer 20 and used to produce a colored print 24 of the test chart. The visual densities of the printed test chart 24 are measured using a densitometer. By way of example, Table 2 summarizes the visual densities obtained for this test chart using a Kodak model XLS-8600 thermal dye sublimation printer with Xtralife thermal ribbon donor, Ektatherm XLS print media and the default printer table. The visual densities are plotted versus the input color code values to the printer for each neutral patch to form the output characteristic curve for the printer/medium combination as illustrated in FIG. 6.

TABLE 2

Reflection density vs. input code value for Kodak XLS-8600 printer.

| Input Code Value | Visual Density |
|---|---|
| 0 | 2.25 |
| 10 | 2.22 |
| 20 | 1.98 |
| 30 | 1.73 |
| 40 | 1.52 |
| 50 | 1.35 |
| 60 | 1.30 |
| 70 | 1.08 |
| 80 | 0.97 |
| 90 | 0.86 |
| 100 | 0.80 |
| 110 | 0.70 |
| 120 | 0.64 |
| 130 | 0.58 |
| 140 | 0.51 |
| 150 | 0.45 |
| 160 | 0.40 |
| 170 | 0.37 |
| 180 | 0.33 |
| 190 | 0.27 |
| 200 | 0.23 |
| 210 | 0.20 |
| 220 | 0.15 |
| 230 | 0.11 |
| 240 | 0.07 |
| 250 | 0.07 |
| 255 | 0.06 |

Figure 7:
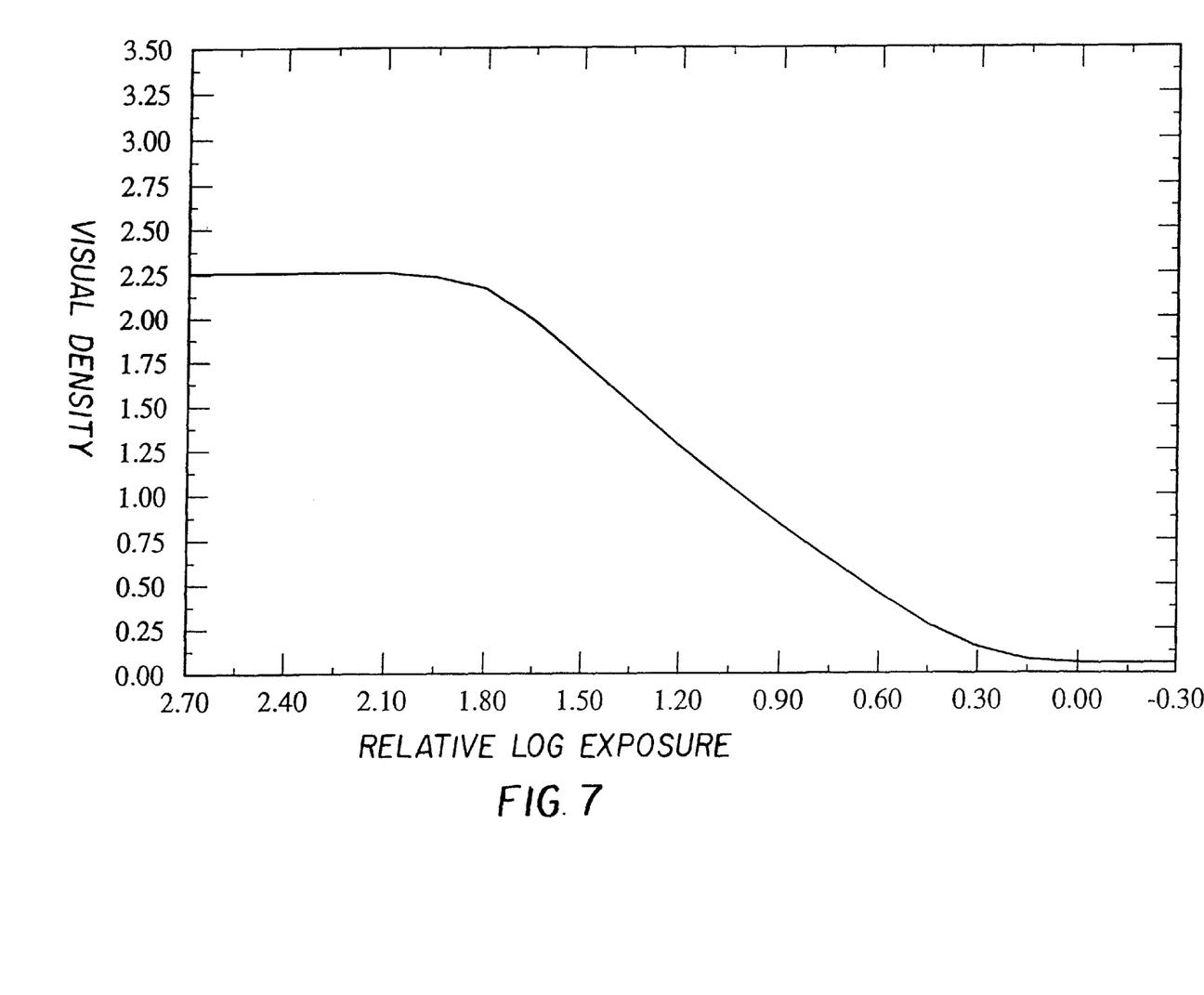
FIG. 7 is a plot of an aim curve of reproduction visual density vs. relative log exposure of the scene in accordance with the present invention.

Turning now to FIG. 7, which illustrates a particular aim curve for a thermal medium which has been produced in accordance with the present invention. The maximum density for this thermal medium was a visual density of 2.25. As well understood to those skilled in the art, this can be measured by a reflection densitometer. The relative log exposure is also plotted. The minimum visual reflection density for this thermal medium was 0.06.

In accordance with the present invention, it has been determined that the mid-region of the aim curve should produce a range of contrast between 1.0 and 1.3 at 0.6 relative log exposure above scene white to 1.0 and 1.7 at a relative log exposure of 1.95 above scene white. The contrast is, of course, the slope of the curve at any point in the mid-region of the aim curve. For a particular thermal medium, the slope of the aim curve was 1.2 at 0.6 relative log exposure above scene white and 1.6 at 1.45 relative log exposure above scene white. For the purpose of this disclosure, the mid-region of the aim curve is defined as starting 0.6 relative log exposure above scene white (100% diffuse reflector) and ending at 1.45 relative log exposure above scene white.

Figure 8:
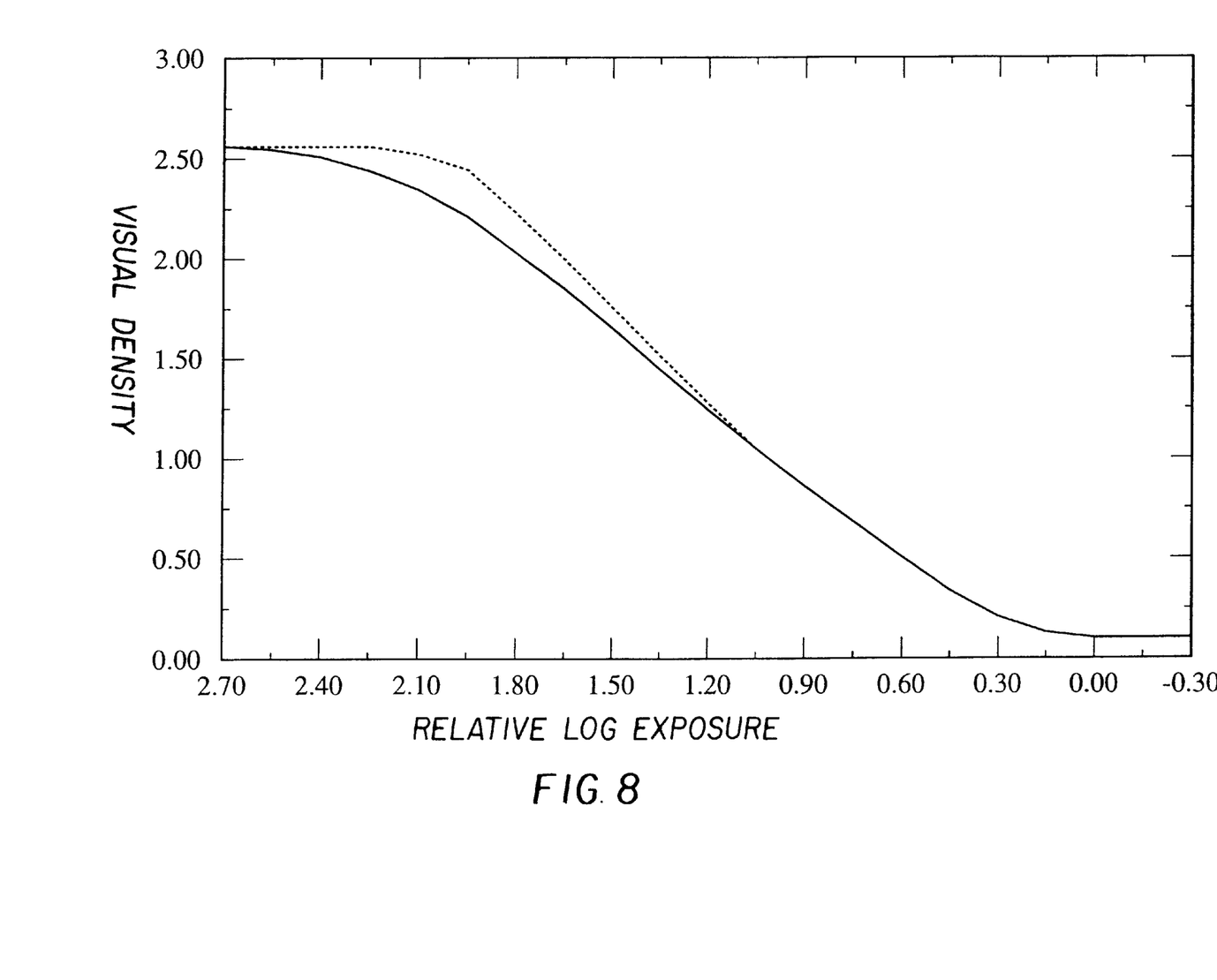
FIG. 8 shows an aim curve similar to FIG. 7 but with an adjustment to compensate for viewing flare.

As shown in FIG. 8 and as discussed in "The Tone Reproduction of Colour Photographic Materials" by Hunt et al., it may be advantageous to gradually increase the contrast of the shoulder end from the mid-region of the aim curve, to Dmax to offset the negative effects of viewing flare.

For any medium, the shoulder and toe of the aim curve can be readily constructed. For the purpose of this disclosure, the shoulder of the aim curve is defined as starting at 1.45 relative log exposure above scene white and ending at 2.7 relative log exposure above scene white. Similarly, the toe of the aim curve is defined as starting at 0.3 relative log exposure below scene white and ending at 0.6 relative log exposure above scene white. The shape of the shoulder and toe of the aim curve is arbitrary. In FIG. 7, the shoulder and toe were derived to approximate the shape of the shoulder and toe of the photographic system.

Figure 9:
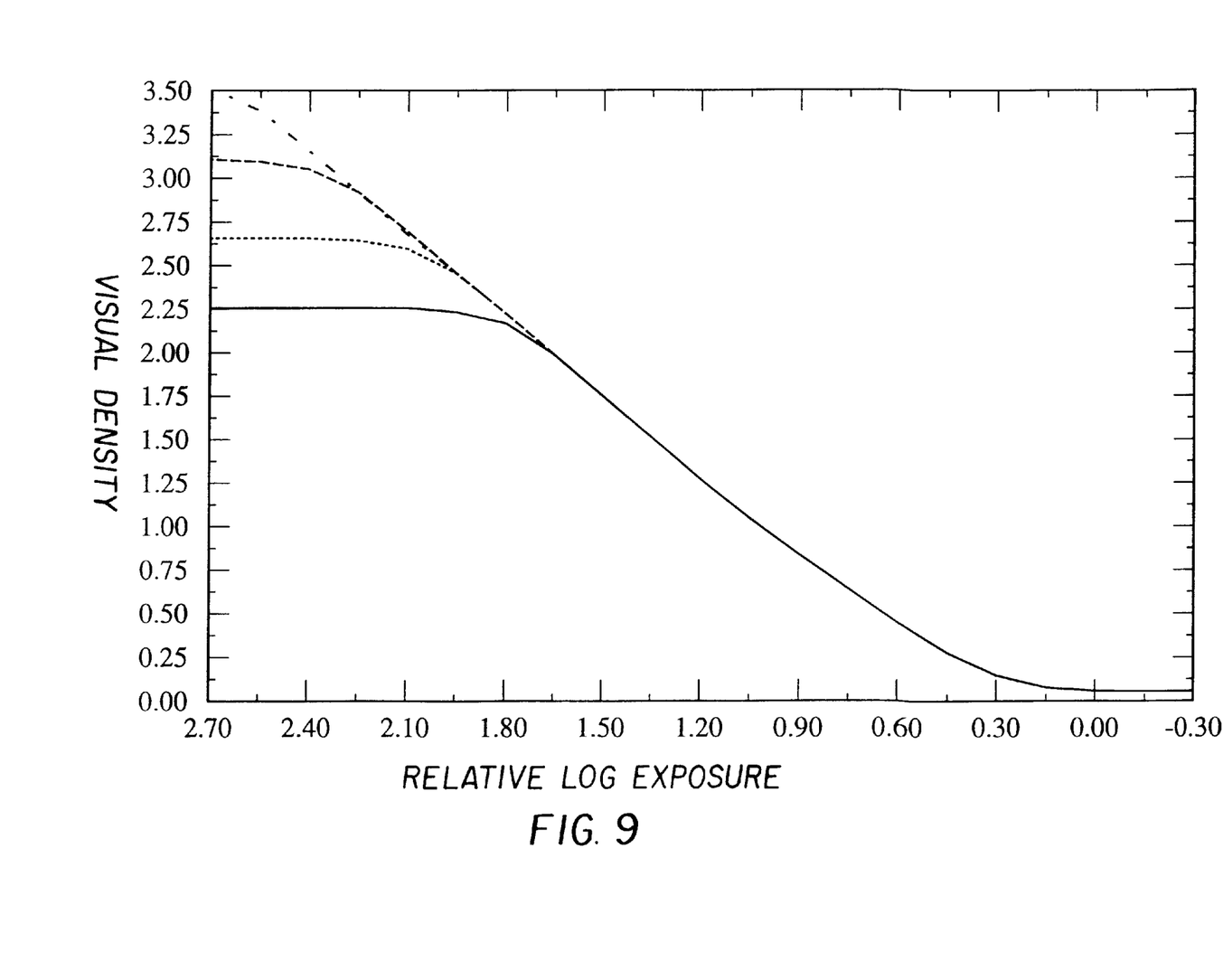
FIG. 9 shows a series of aim curves for different printer media.

In accordance with the present invention, aim curves for media which have larger or smaller dynamic ranges than shown in the example can be readily derived by changing the length of the mid-region. For example, as shown in FIG. 9, for media with a Dmax higher than 2.25, the mid-region should be extended above a scene relative log exposure of 1.45, thereby pushing the shoulder portion of the aim curve higher until Dmax is reached at a scene relative log exposure of 2.7. Similarly, for media with a Dmin lower than 0.06, the mid-region of the aim curve should be extended below a scene relative log exposure of 0.6, thereby pushing the toe portion of the aim curve lower until Dmin is reached at the scene relative log exposure range of 0.0 to −0.3.

Figure 10:
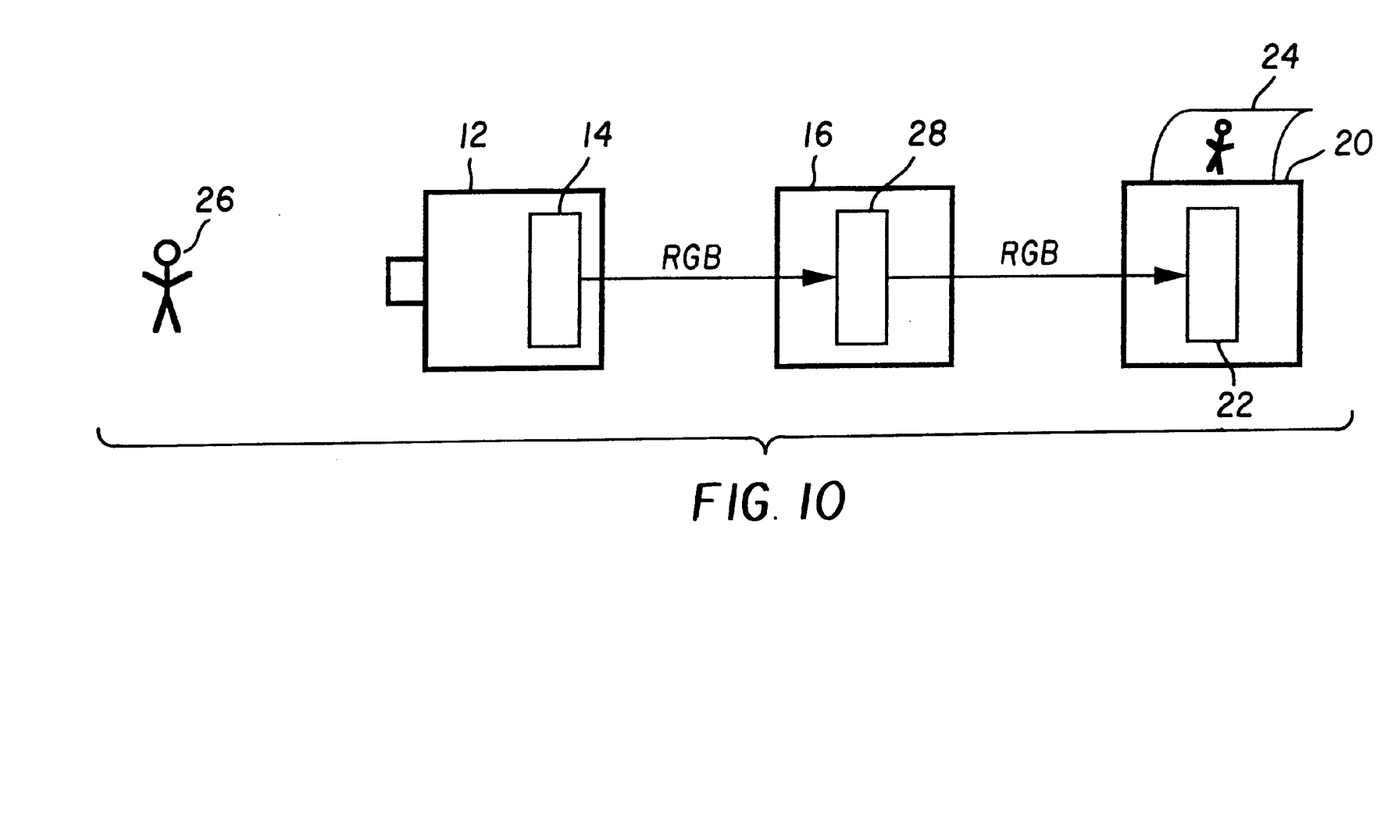
FIG. 10 is a block diagram of a system which uses a transform in accordance with the present invention to make prints.

FIG. 10 shows a block diagram of an imaging system which makes esthetically pleasing colored prints using the transform. An image of a scene 26 is captured by the image capture device 12 and stored in digital form in the image capture device memory 14. Output color code values representative of the captured image are transferred from the memory 14 of the image capture device into a memory 28 of the digital computer 16. A transform, derived in accordance with this invention, is applied to the output color code values within the digital computer memory 28 to produce printer input color code values. Printer input color code values are transferred from the digital computer memory 28 to the memory 22 of the printer 20. The printer 20 produces an esthetically pleasing colored print 24 representative of the scene 26.

Transforms made in accordance with the present invention can be stored in a computer readable storage medium. The computer readable storage medium may comprise, for example; magnetic storage media such as magnetic disc (such as a floppy disc) or magnetic tape; optical storage media such as optical disc, optical tape drive, or machine readable bar code; solid state electronic storage devices such as random access memory (RAM), or read only memory (ROM); or any other physical device or medium employed to store a computer program.

The invention has been described in detail with particular reference to certain preferred embodiments thereof, but it will be understood that variations and modifications can be effected within the spirit and scope of the invention.

PARTS LIST

10 Image capture device characterization test chart
12 Image capture device
14 Capture device image memory
16 Digital computer
18 Printer characterization test target
20 Printer
22 Printer image memory
24 Reflection print of test chart 18
26 Scene
28 Digital computer memory

What is claimed is:

1. A method for constructing a transform for a predetermined display or printer, such printer being adapted to form a black and white or color print, on a particular medium, the input to the transform being a digital image file produced by a particular image capture device, comprising the steps of:

a) providing an input characteristic curve which is a function of the output color code values from the image capture device and relative log exposure of the scene;

b) providing an aim curve which is a function of the visual density of the display or colored print and the image capture relative log exposure wherein the mid region of the aim curve is in a range of contrasts from between 1.00 and 1.30 at a relative log exposure of 0.6 above scene white to a contrast of between 1.0 and 1.7 at a relative log exposure of 1.45 above scene white and the shoulder of the curve ends at the maximum density (Dmax) of the particular medium and the toe of the curve ends substantially at the minimum density (Dmin) of the particular display or medium;

c) providing an output characteristic curve which is a function of the input color code values to the predetermined display or printer and the visual density from a display or print on a particular medium; and d) using the aim curve, the input characteristic curve, and the output characteristic curve to produce the transform.

2. The method of claim 1 wherein the transform is selected to have points between Dmin and Dmax which produce an esthetically pleasing print.

3. The method of claim 2 wherein the contrast of the shoulder of the aim curve is gradually increased to reduce viewing flare.

4. The method of claim 1 wherein, when the transform is for a printer, further including using the transform to produce any desired number of prints from a printer which uses the particular print medium.

5. The method of claim 4 wherein the image capture device is a digital camera and the particular medium is a thermal print medium.

6. The method of claim 4 wherein the printer is an ink jet printer.

7. The method of claim 4 wherein the printer is an electrophotographic printer.

8. A transform made in accordance with claim 1.

9. A computer program product comprising a computer readable storage medium, including a transform made by the steps of:
   a) providing an input characteristic curve which is a function of the output color code values from the image capture device and relative log exposure of the scene;
   b) providing an aim curve which is a function of the visual density of the display or colored print and the image capture relative log exposure wherein the mid region of the aim curve is in a range of contrasts from between 1.00 and 1.30 at a relative log exposure of 0.6 above scene white to a contrast of between 1.0 and 1.7 at a relative log exposure of 1.45 above scene white and the shoulder of the curve ends at the maximum density (Dmax) of the particular medium and the toe of the curve ends substantially at the minimum density (Dmin) of the particular display or medium;
   c) providing an output characteristic curve which is a function of the input color code values to the predetermined display or printer and the visual density from a display or print on a particular medium; and
   d) using the aim curve, the input characteristic curve, and the output characteristic curve to produce the transform.

* * * * *